United States Patent [19]

Jensen et al.

[11] 4,274,331
[45] Jun. 23, 1981

[54] WAFER BAKING MACHINE

[75] Inventors: Billy M. Jensen, Sandy; Ronald H. M. Brunner, Salt Lake City, both of Utah; Lang S. Wong, 875 N. 1500 West, Salt Lake City, Utah 84101

[73] Assignee: Lang S. Wong, Salt Lake City, Utah

[21] Appl. No.: 478,111

[22] Filed: Jun. 10, 1974

[51] Int. Cl.³ .................... A47J 37/00; A21B 5/00
[52] U.S. Cl. .......................... 99/373; 99/374; 99/443 C
[58] Field of Search ............. 99/355, 374, 443 C, 99/373, 353, 423; 198/159, 179, 570, 581

[56] References Cited

U.S. PATENT DOCUMENTS

| 5,816 | 9/1848 | Scoville | 198/159 |
|---|---|---|---|
| Re. 14,651 | 5/1919 | Lanier | 99/373 |
| 1,130,568 | 3/1915 | Callow | 198/159 |
| 1,477,842 | 12/1923 | Narobe | 99/373 |
| 1,775,918 | 9/1930 | Smith | 198/179 |
| 1,962,144 | 6/1934 | Groset et al. | 99/373 |
| 2,362,677 | 11/1944 | Stephens | 198/76 |
| 2,615,309 | 10/1952 | DeMore | 198/179 |
| 2,819,691 | 1/1958 | Schlicksupp | 99/373 |
| 3,097,588 | 7/1963 | DeJersey | 99/353 |
| 3,338,188 | 8/1967 | Booth | 99/373 |
| 3,780,193 | 12/1973 | DeJersey | 99/373 |

FOREIGN PATENT DOCUMENTS 893202 4/1962 United Kingdom ............ 99/423

Primary Examiner—John W. Shepperd
Attorney, Agent, or Firm—Robert E. Krebs

[57] ABSTRACT

A machine for baking thin wafers of the type which are foldable to form fortune cookies includes an oven, a parallel chain conveyor that moves continuously in a plurality of horizontal runs through the oven, and a plurality of baking units carried by the conveyor. Each baking unit consists of two associated platens mounted in movable face-to-face parallelism. The wafers are baked in cupped containers which are carried by one of the platens and which are sealed by the other platen during baking. Following a baking period, the platens are inverted. A mechanism is provided to remove baked wafers from the inverted platens. Finally, a mechanism is provided to carry the removed wafers to discharge from the machine.

13 Claims, 11 Drawing Figures

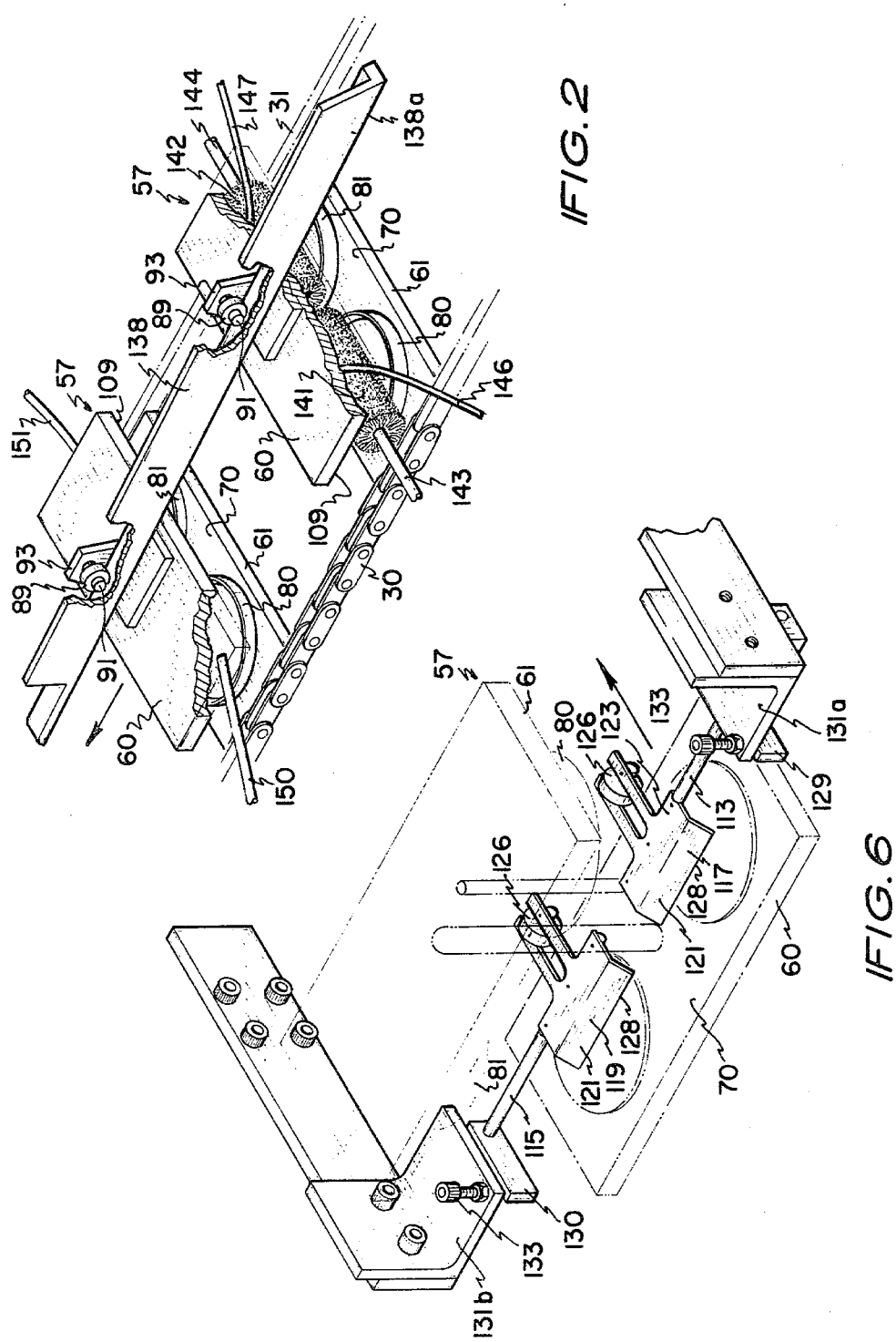

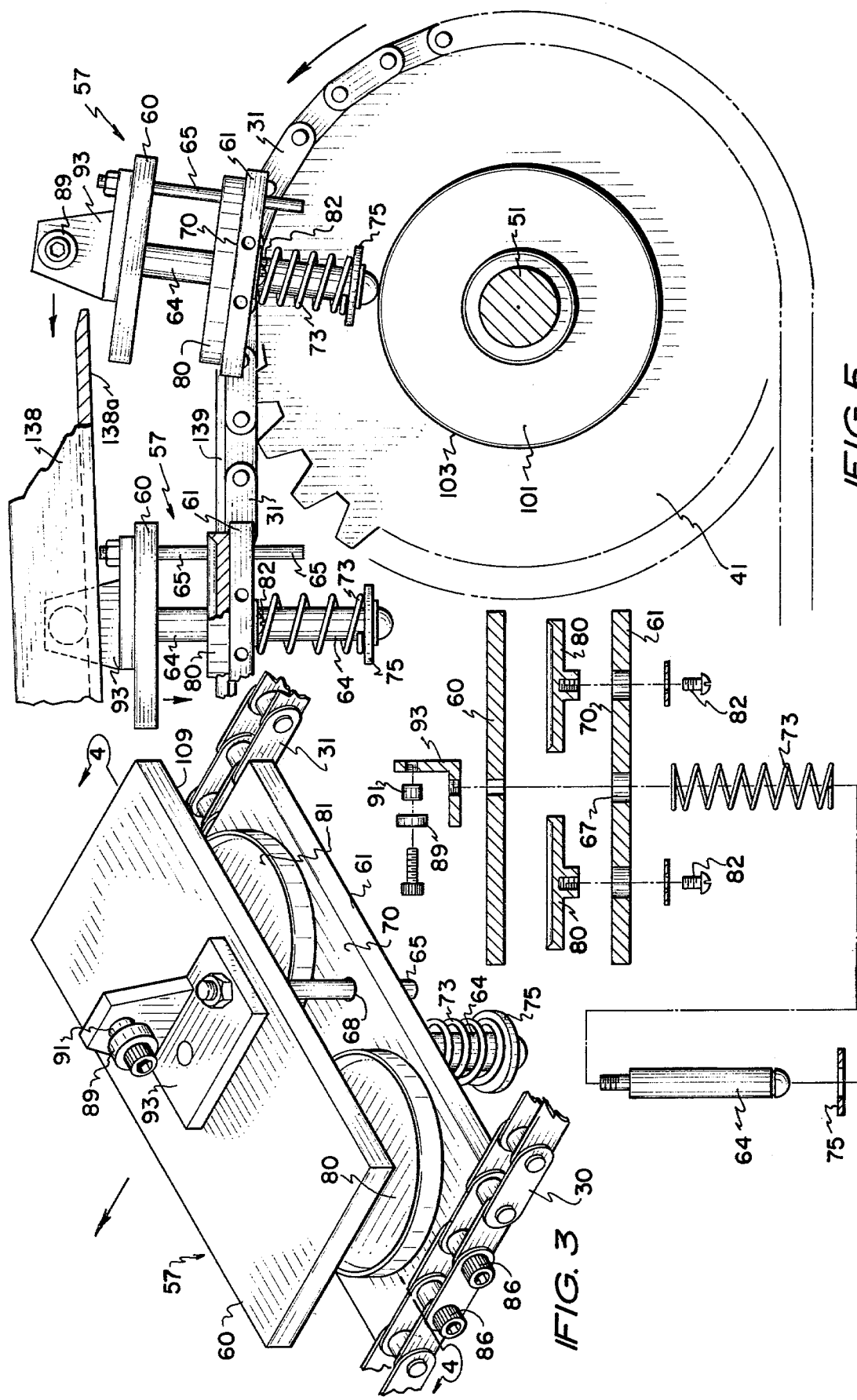

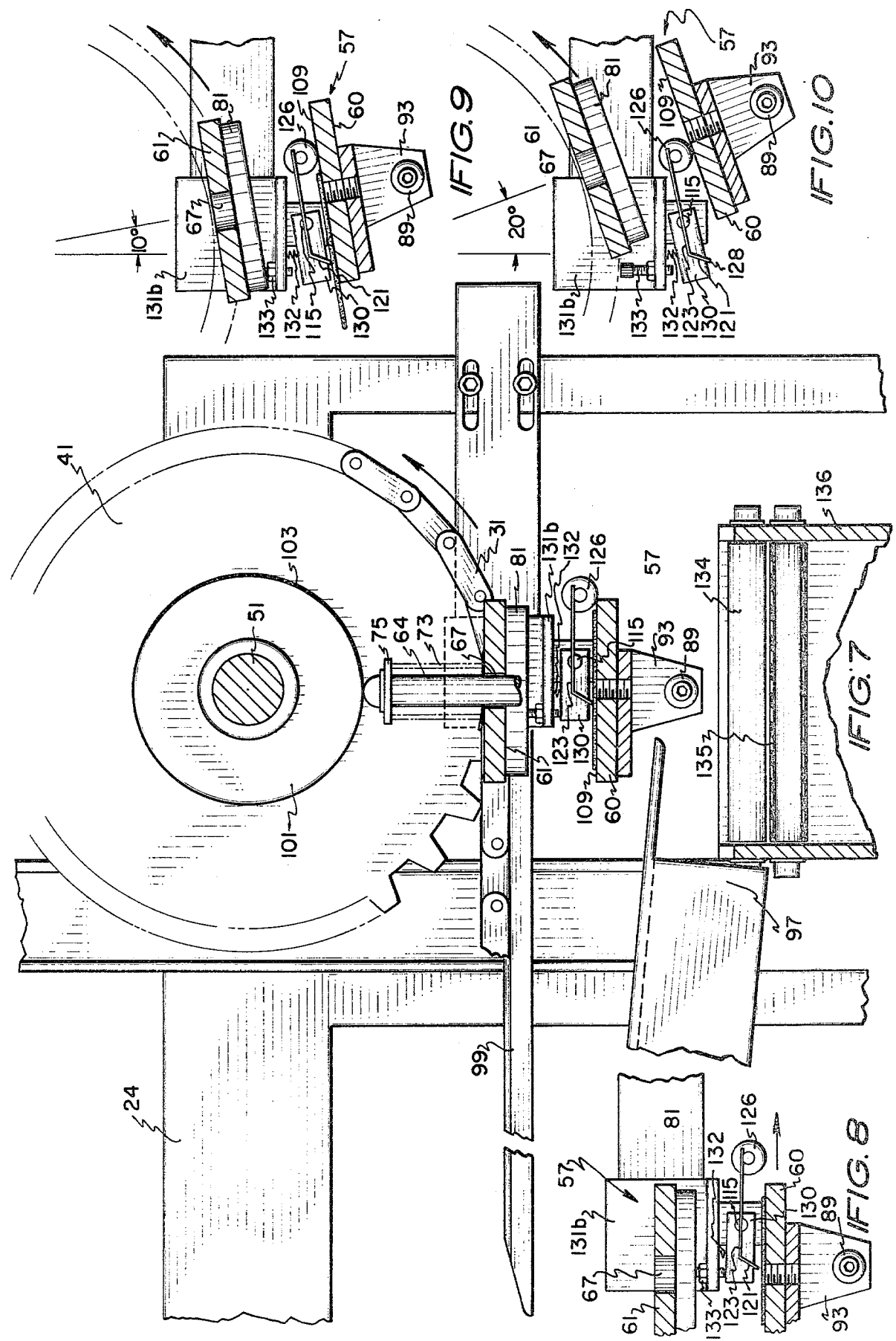

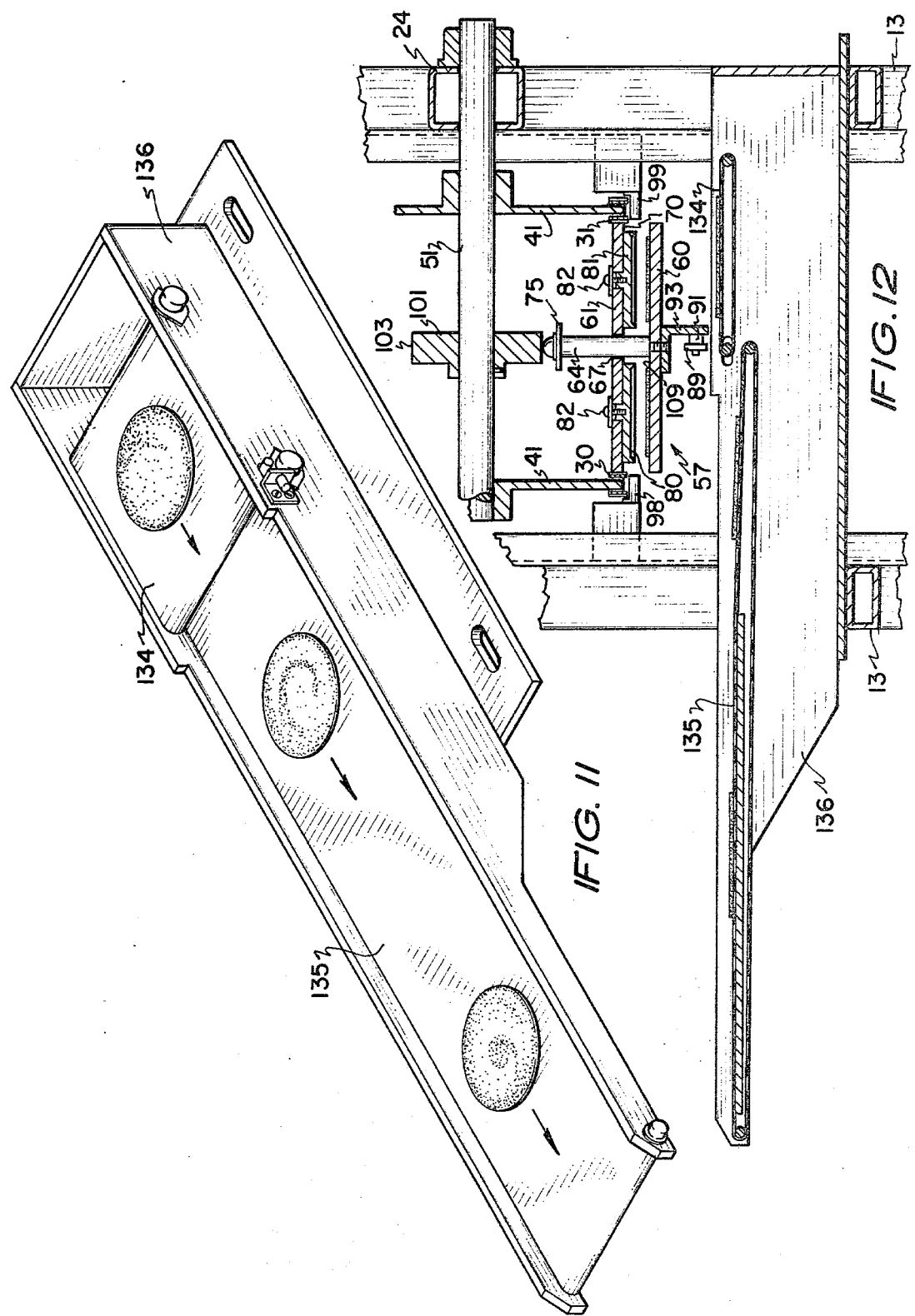

WAFER BAKING MACHINE

BACKGROUND OF THE INVENTION

1. Field of the Invention

The present invention relates generally to an apparatus for the manufacture of baked foods and, more particularly, to an automatic machine for baking flat wafers from a batter where such wafers are adapted for subsequent folding to form fortune cookies.

2. State of the Art

A fortune cookie is a specialty food formed by folding a thin circular wafer about a pair of perpendicular axes into a characteristic shape. The general ingredients of a fortune cookie are water, flour, sugar, shortening and vanilla flavoring which are blended to form a batter according to various recipies known to workers in the art.

According to conventional prior practice, the batter is poured into special molds which are then heated to bake the wafers flat. A mold typically includes a shallow cupped container for holding a small quantity of the batter and a heavy cover plate which is pivotably mounted to sealingly cover the cupped container during the baking period. A single mold "unit" usually includes two side-by-side cups. In commerical ovens, a plurality of such mold units are arranged at spaced-apart intervals around a circular frame which is rotatable like a carrousel. The mold units are heated by gas flames as they rotate horizontally with the frame beneath special hoods. After baking the thin flat wafers are folded into the characteristic fortune cookie shape while still warm and pliable.

In conventional practice, the wafers are manually removed from the molds, usually by manipulating a sharpened wooden implement to scrape or shovel the wafers from the cupped containers. Manual removal of the wafers, however, is unduly slow if automatic or semi-automatic folding machines are to be used at high production rates.

Ovens which include automatic means for removing wafers are taught in U.S. Pat. Nos. 3,605,642 and 3,265,016. In the former patent, FIG. 1 and 3 show wafers being "ejected" from baking cups by piston-like inserts disposed in the bottoms of the cups; thereafter, the wafers are plied from the faces of the inserts. Also in the former patent, dual folding devices are provided for use with double-cup baking units. In the latter patent, wafers are dislodged from an intermittantly-operated apertured belt by means of a bifurcated folding member.

BRIEF SUMMARY AND OBJECTS OF THE INVENTION

The present invention comprises a novel machine for automatically baking thin wafers of the type which are foldable to form fortune cookies. In one detailed aspect, the machine includes a novel means for removal of the wafers from the machine. The present invention not only operates satisfactorily at high production rates but, also, provides additional advantages as will be made clear hereinafter. Among the objects of the present invention, the primary object is to provide improved ways and means for baking flat circular wafers from a batter. Other objects and advantages of the present invention may be readily ascertained by reference to the following description and appended illustrations which are offered by way of example only of the preferred embodiment and not in limitation of the invention, whose scope is defined by the appended claims and by equivalents to the structure, material and functions described in the specification.

BRIEF DESCRIPTION OF THE DRAWINGS

In the drawings:

FIG. 2 is a pictorial detail of a mechinism of the machine of FIG. 1 located in the area encircled by the arrows 2—2;

FIG. 3 is a pictorial detail of another mechanism of the machine of FIG. 1, the mechanism being drawn to an enlarged scale for purposes of clarity;

FIG. 4 is a sectional view of the mechanism of FIG. 3 taken along the line 4—4 and exploded for purposes of clarity;

FIG. 5 is an enlarged detail of the machine of FIG. 1 shown in side elevation with some parts removed;

FIG. 6 is a pictorial detail of another mechanism of the machine of FIG. 1 isolated for clarity;

FIG. 7 is a view similar to FIG. 5 illustrating another position of the mechanism;

FIGS. 8, 9, and 10 are schematic details illustrating the motion of a mechanism shown in FIG. 7;

FIG. 11 is a pictorial detail of still another mechanism included in the machine of FIG. 1; and FIG. 12 is a cross-sectional view taken along the lines 12—12 in FIG. 1 viewed in the direction of the arrows.

DETAILED DESCRIPTION OF THE PREFERRED EMBODIMENT

Figure 1:
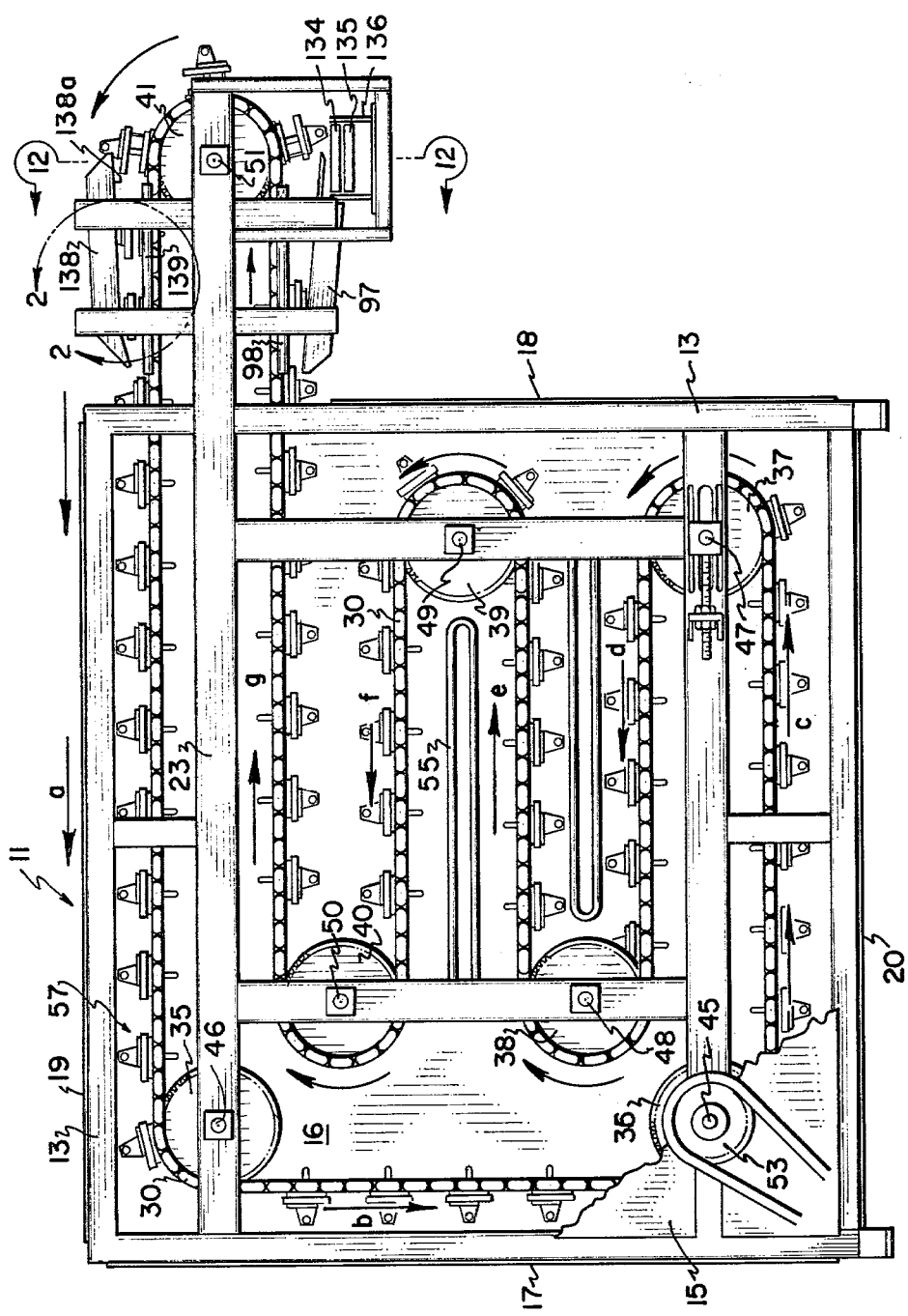
FIG. 1 is a side elevation of one embodiment of a machine according to the invention.

In FIG. 1, an oven 11 generally includes a rigid structural frame 13 that defines a rectangular box-like space which is relatively long and high compared to its width. In practice, the frame is about five feet long and is fabricated from rigid channel members. In assembled condition the oven is completely enclosed by insulating panels or walls 15-20, but those panels are cutaway in the drawings for the sake of clarity. A pair of parallel frame members 23 and 24 extend outwardly beyond one end of the oven enclosure for stationarily supporting a batter injection device annd a wafer removal mechanism, both of which will hereinafter be described in detail.

Within the oven enclosure, a pair of side-by-side endless chains are disposed to travel in a plurality of zigzagging horizontal runs "c"-"g" from the lower region of the oven to the upper region. In practice, the two identical chains are spaced about four inches apart and are of the roller type. To support and guide the chains, associated pairs of spaced-apart sprocket wheels 35-41 are concentrically mounted on horizontally-disposed axles 45-51, respectively, that extend transversely across the oven enclosure. The axles are supported in journals fixed to the frame members and, preferably, at least some of the axles are adjustably positionable so that the chain tension can be selectively varied. FIG. 1, for example, shows a take-up adjustment associated with sprocket axle 47. The travel of the chains in the illustrated oven will now be particularly described in order to facilitate understanding of other features of the machine. It should be appreciated, however, that the chain path is a matter of design choice and that other chain arrangements could be implemented without departing from the scope or spirit of the present invention. As indicated by the arrows, the chains travel horizontally from right to left in run "a" adjacent the top of the oven. At the end of the upper horizontal run "a", the carrier chains turn ninety degrees around a first sprocket set 35 and then travel vertically downward along run "b" to another sprocket pair 36 over which they are trained to begin a horizontal run "c" which extends parallel to the base of the oven enclosure from left to right. Then, the chains reverse direction about a sprocket wheel pair 37 and move horizontally from right to left across the oven in run "d". At the end of that run "d", the chains are trained about another pair of sprocket wheels 38 and thence travel from left to right in a fourth horizontal run "e". Thereafter, the chains wrap 180° around another pair of sprockets 39 and thence travel to the left in a run "f" to a sprocket set 40 about which they are trained to follow a horizontal run "g" that extends beyond the end of the oven enclosure. A seventh sprocket set 41 is rotatably mounted near the far ends of the aforementioned support members 23 and 24; that sprocket set 41 defines the end of run "g" and serves to reverse the direction of travel of the chains back toward the oven along the upper run "a".

Conventional electric heating elements 55 and 56 are stationarily disposed to extend lengthwise in the oven enclosure below runs "e" and "f". The oven is heated to a constant temperature usually ranging between 200 and 550 degrees farenheight depending upon the elevation, rate of production, characteristics of the batter and other variables. The oven temperature can, of course, be thermostatically controlled by various conventional means. Preferably the oven is electrically heated, but gas heating can also be employed.

According to the arrangement illustrated in FIG. 1 the endless chains 30 and 31 are continuously driven by the sprocket axle 45 which is located in the lower left corner of the oven. A gear 53 is fixed to that axle outside the oven enclosure and is coupled to a prime mover such as a conventional drive motor or the like, not shown. Other drive arrangements could, of course, be provided.

The endless chains 30 and 31 are provided to carry special baking units 57 through the oven. The baking units are fixedly mounted at spaced-apart intervals along the chains, say one unit each six inches, in ladder-like fashion. As shown in FIG. 3 and 4, the baking units each include two rectangular flat plates, or platens, 60 and 61 which are arranged in face-to-face parallelism with one another. The two platens are slidably associated by means of two parallel spaced-apart stem-like members 64 and 65 that fixedly extend perpendicularly from the upper platen 60 through associated apertures 67 and 68 formed in the lower platen 61. With this construction and arrangement, the upper platen can slide in a reciprocative fashion on the stems toward and away from the face 70 of the lower platen while always remaining parallel thereto.

The first stem member 64 is longer than the second and projects substantially below the lower platen 61. A stiff compression spring 73 encircles the first stem and is retained by a collar member 75 fixed to the stem's distal end. The spring biases or pulls the upper platen 60 downward toward the lower platen 61. In this arrangement, the second stem 65 serves only as a locating member to restrain the platens from rotating relative to one another; alternatively, other alignment means and arrangements could be provided.

A pair of side-by-side circular cups 80 and 81 are mounted on the upper faces 70 of the lower platens 61 of each of the baking units 57. The cups are fairly shallow (say about one-quarter inch deep) with sidewalls of uniform height and flat bottoms. Preferably, the cups are removably mounted on the lower platens, say by screws 82 but they could be formed integrally therewith. In practice, the cups and platens are made from metal and their working surfaces may be chrome plated for extra smoothness.

In the illustrated arrangement, the cup-bearing platens 61 are connected transversely between the parallel endless chains 30 and 31. The chains are connected to the edges of the cup-bearing platens by screws 86 or the like. With such an arrangement, a sprocket can engage the chains either from above or below; the horizontal runs are, in fact, defined by such alternative engagement at opposite ends thereof. Preferably the cup pairs are aligned perpendicular to the direction of chain travel and are located somewhat away from the perimeter of the platens 61 for reasons which will be explained later.

During the baking cycle, the upper platens 60 are pulled downward by the springs 73 and sealingly cover the baking cups 80 and 81. Accordingly, the wafers actually bake under pressure due to the heated gases and vapors trapped within the cups. Experience has taught that such a manner of baking is important to forming wafers having the texture and consistancy best suited for subsequent folding. A baking cycle should be understood to be completed whenever one of the baking units 57 leaves the oven enclosure on run "g" as shown in FIG. 1.

Referring again to FIG. 2, a small roller wheel 89 is mounted on the top of each of the upper platens 60. Each wheel is rotatably mounted on a stub axle 91 which is held by a bracket member 93 so that the axis of rotation of the roller is parallel to the surfaces of the associated platens and normal to their direction of travel. Further, each bracket is constructed and arranged on the associated upper platen 60 such that there is an open gap between the perimeter of the roller 89 and the surface of the platen. The rollers are utilized in opening the platen pairs after a baking cycle is completed as will now be described.

As shown in FIGS. 1 and 7, the baking units 57 are inverted on the run "g" as they leave the oven enclosure and, in that orientation, the rollers 89 project downwardly. Beneath run "g", a rail member 97 is stationarily mounted to extend in the direction of travel of the successive baking units 57 and in alignment with the rollers thereon. Furthermore, the rail is disposed at a slight downward angle from the horizontal, say ten to fifteen degrees, from a high end near the oven enclosure. The rail 97 includes a horizontal edge portion which is constructed and arranged to engage the rollers 89 as the baking units leave the oven. More particularly, the rail edge extends into the aforementioned gap or space between a roller and the surface of the consociated platen. The rollers initially run onto the higher end of the rail and then travel downward therealong and, in so doing, progressively pull the platen pairs apart. With the platen assemblies open, the baked wafers quickly begin to cool and become firm.

As shown in FIGS. 1 and 7, pairs of track members 98 and 99 are stationarily disposed beneath the respective endless chains 30 and 31 parallel to run "g" outside the oven enclosure. The tracks are provided to guide the chains horizontally and to restrain them from displacement as the baking units are pulled open. But for the guides, the chains would stretch toward the rail 97 and the baking units would not open fully.

The lower end of the aforementioned rail 97 terminates adjacent to a curved bearing member 101 which is constructed and arranged to present an arcuate bearing surface 103 that extends parallel to the path of travel of the baking units around the sprocket set 41. The bearing surface 103 is provided to contact and press against the distal ends of the first stem members 64 so that the baking units 57 are maintained open as they travel around the sprocket set 41 from run "g" to run "a". But for the arcuate bearing surface 103, the platen pairs would clamp together after release by the rail 97. Preferably, but not necessarily, the bearing member 101 is a thick disc which is concentrically mounted on the axle 51 midway between the two sprockets 41 and the periphery of the disc serves as the bearing surface 103. Also, it is preferred that the distal ends of the stem members 64 be smoothly rounded so that they do not unduly wear the bearing surface 103.

Just prior to the travel of the baking units around the sprocket set 41, means are provided to remove the wafers from the baking cups. To understand the operation of the wafer removal mechanism, it must be appreciated that the baking cups are inverted along the run "g" and that baked wafers normally fall from the cups onto the surface 109 of the opposite platen 60 due to the inversion. In practice, dislodgement of the wafers from the cups may be partially due to some jerkiness in the conveyor mechanism, and, particularly, to the slight impacts on the platens 61 as the baking units make the transition from the rail 97 to the curved bearing surface 103. Also, the dislodgement is aided by cleaning and oiling the baking cups before placing cookie batter therein. (A mechanism for cleaning and oiling the cupped containers will be described hereinafter.)

As shown in FIG. 6, wafer removal mechanism includes two thin shafts 113 and 115 which extend stationarily from opposite sides of the frame into the space between the open platen assemblies 57 as they begin to travel around the sprocket set 41. That is to say, the shaft 113 extends from the near side of the frame to a position between the platens 60 and 61 below the cups 80, and the shaft 115 extends from the other side of frame to a position below the cups 81. Pivotally mounted on the respective shafts are specially shaped "pusher" members 117 and 119. Viewed from the side, each pusher member has a downwardly sloping nose portion 121 extending from a broad body section 123 and a bifurcated tail section on which a roller wheel 126 is rotatably mounted between the bifurcations. Viewed from above, each nose portion 121 includes a relatively long edge 128 which extends transversely to the direction of travel of the cooking units. Preferably, the edge 128 is slightly serrated or has a saw-tooth configuration, although such a feature is not strictly necessary. The body sections 123 are pivotally connected to the associated ones of the aforementioned shafts 113 and 115 to swing in an arc parallel to the direction of travel of the baking units 57.

Normally, the weight of the rollers 126 would rotate the pusher members into a nearly vertical orientation; however, adjustable stop members 129 and 130 are fixed to the shafts of the respective pusher members and arranged to abut associated stationary bracket pieces 131a and 131b to prevent full rotation of the pusher members. (In the illustrated arrangement, the stop members also have a slight counter-balancing effect.) Adjustment screws 133 can be provided on the respective brackets 131a and 131b for selective adjustment of the stop position of the pusher members. In practice, the assembly is adjusted so that the body section is nearly horizontal in the stop position as shown in FIG. 8.

In operation, the pusher members 117 and 119 are actuated by the advancing platens 60 to push the baked wafers therefrom. More particularly, the leading edges of successive platens 60 strike the depending rollers 126 which, in turn, run onto the platen surfaces 109. The pusher members are constructed and arranged such that the nose portions 121 swing downwardly as the rollers ride onto the platens and, thence, the serrated edges press against the tops of the wafers lying on the platen surfaces 109. As the baking units continue to travel, the pusher members slide the wafers from the platen. The wafers thence fall downwardly onto a conveyor mechanism that will be described hereinafter. Preferably, the pusher mechanisms are located below the bearing surface 103 in a position such that the platen assemblies 57 have actually tilted slightly from horizontal by the time that the wafers are pushed therefrom. In such an orientation, the wafers are more likely to fall flat onto the conveyor mechanism; if the platens were horizontal at the time of discharge, the wafers would have a greater tendency to flip over during their fall and, upon landing, there would be greater probability of wrinkling or other damage. The aforedescribed sequence of operation of the pusher mechanisms can be observed seriatim in FIGS. 8, 7, 9 and 10.

Occasionally wafers stick in the cups and, thus, are not operated upon by the pusher mechanisms. Experience has shown that such wafers are very likely to be dislodged as the cups are tilted vertically in passage from run "f" to run "a" around the sprocket set 41. Since the baking units are still open during such passage, the wafers can fall freely onto the underlying conveyor mechanism. This then explains another purpose of the bearing member 101 which maintains the baking units open during their travel from runs "f" to "a".

Referring now to FIGS. 7, 11, and 12, the aforementioned wafer discharging conveyor mechanism includes two endless belts 134 and 135 that are arranged immediately below the location whereat the baked wafers fall, or are pushed, from between the platen pairs 57. The two belts 134 and 135 are horizontally-disposed in a frame 136 and are arranged in series; which is to say, the rearward 134 is positioned to catch the wafer from the rearward cups 81 and the forward belt positioned to catch the wafer from the forward cups 80. Both belts are driven to travel in the same forward direction, and the rearward belt 134 is arranged to convey wafers onto the forward belt 135. In operation the forward belt is run much faster than the rearward belt and, accordingly, a wafer discharged from the forward cup travels a considerable distance on the forward belt before a rearwardly-discharged wafer even reaches that belt. The endless belts can be driven by an appropriately arranged electric motor or the like, not shown. In practice, the forward belt 135 carries the wafers to a location whereat they are folded, either manually or automatically.

It should be appreciated that the cooperative action of the two conveyor belts 134 and 135 serves to space the wafers apart so that they reach a folding station at intervals. By appropriately determining the oven speed, the system may be timed such that all wafers reach the folding location at equal intervals. Regular timing is expecially important if an automatic folding device is to be employed which folds the wafers one by one.

As shown in FIG. 5, the baking units 57 are open as they complete the turn around the sprocket set 41. Thereafter, a second rail 138 is stationarily positioned above run "a" to engage the rollers 89 on the upper platens 60 to maintain the baking units open as they travel for a distance along run "a". More particularly, the second rail 138 extends in the travel direction of the baking units in alignment with the rollers 89 and, also, slopes downward at a slight angle from a higher end above the curved bearing member 101. Like the first rail member 97, the second rail 138 also includes a edge portion 138a which extends into the gaps between the rollers 89 and the tops of the platens 60 to engage the rollers. In the case of the second rail 138, however, the associated platens move progressively together, or close, as the rollers travel along the rail. Also, it is preferable to mount a pair of parallel track members 139 above the respective endless chains 30 and 31 parallel to run "a" outside the oven enclosure. (Only the track member adjacent chain 31 can be observed in the sectional view of FIG. 5.) The tracks 139 are provided to guide the associated chains horizontally and to restrain them from vertical displacement during the time that the baking units are maintained open by the second rail 138; otherwise the chains would stretch towards that rail and the baking units would close prematurely.

Before the units close completely and re-enter the oven, the baking cups are cleaned and oiled and, then, batter is injected thereinto as now will be described. The second rail 138 maintains the platen pairs open sufficiently long for such functions to be performed.

The cleaning and oiling mechanism which is illustrated in FIG. 2 includes a pair of rotatable brushes 141 and 142 that extend horizontally from opposite sides of the frame into the space between the open platen pairs on run "a". The brushes each include rotatable shafts 143 and 144 with bristles radially extending therefrom. The shafts can be driven to rotate jointly by various conventional drive means (not shown). In the illustrated arrangement, oil injection nozzles or conduits 146 and 147 are disposed above each of the brushes to spray or drop cooking oil thereonto; the brushes then apply the oil evenly to the cups 80 and 81. Alternatively, the oil can be sprayed into the cups after cleaning.

A batter injection mechanism, also shown in FIG. 2, comprises a pair of tubes 150 and 151 which are arranged to inject batter into associated ones of the baking cups 80 and 81 before the platen pairs close on run "a". The batter is pumped from a reservoir, not shown, by means of a conventional pumping mechanism. Various pumps are commercially available which will function adequately in such an application. The pumps should be activated intermittently to eject batter only when cups are located below the injection tubes; such intermittent operation is readily accomplished by providing a limit switch, not shown, at a location to be tripped just as the cups are in a proper position to receive the batter. Shortly after the batter is injected, the moving platen pairs reach the end of the second rail 138 and, thence, clamp together and re-enter the oven to commence another baking cycle.

We claim:

1. In a baking machine including an oven and a single endless conveyor which travels through the oven, the improvement comprising:

a. a plurality of baking units fixedly mounted on said single endless conveyor, each of said baking units including:
      (i) an upper platen and an associated lower platen, comprising a pair, between which goods are baked, the face of said upper platen which is directed toward said lower platen being flat; and
      (ii) connecting means which connect said upper and lower platens of said pair for movement towards and away from one another while maintaining face-to-face parallelism therebetween, said connecting means normally maintaining said upper and lower platens clamped together during a baking cycle;
      (iii) a cupped member fixed on said lower platen to face the said upper platen;
   b. opening means mounted to said oven at a selected position to move said associated upper and lower platens apart when said baking units are in an inverted position; and
   c. a pusher member mounted to push the baked wafers from said flat face of a said upper platen when said baking units are inverted and said upper and lower platens are parted, said pusher member including:
      (i) a body section that is pivotally mounted to said oven and a nose portion that extends from one end of said body section; and
      (ii) a roller mounted at the opposite end of said body section; said pusher member being positioned such that, when said associated upper and lower platens are parted, said roller rides onto said flat face of said upper platen and said nose portion engages a baked good lying thereon to push the same from said upper platen.

2. The improvement according to claim 1 wherein said pusher member is positioned to press downwardly onto the surface of a baked good lying on said faces of said opposite platens as said roller runs onto said faces.

3. A baking machine comprising:
   a. an oven enclosure of generally box-like configuration;
   b. associated pairs of sprocket wheels rotatably mounted on horizontally disposed axles that extend transversely across said oven enclosure;
   c. a pair of endless chains trained over said associated pairs of sprocket wheels, the latter being mounted at locations within said oven enclosure such that said pair of endless chains travels in a zigzag path through three or more horizontal runs within said oven enclosure and such that the two chains of said pair of endless chains are in side-by-side spaced-apart relationship with each other;
   d. a plurality of baking units fixedly mounted at spaced-apart intervals to said pair of chains in ladder-like fashion, each of said baking units including:
      (i) a lower platen which is connected between said spaced-apart chains at its opposite outboard edges to permit said sprocket wheels to engage said chains from above or below;
      (ii) at least one cup member fixedly mounted on the upper face of said lower platen for containing material to be baked;
      (iii) an upper platen, the face of said upper platen which is directed toward said lower platen being flat, and connecting means reciprocatably connecting said upper platen to said lower platen in face-to-face parallel relationship therewith;

(iv) resilient biasing means connected to said mounting means to force said upper platen toward said lower platen to cover said at least one cup;

e. opening means mounted to said oven enclosure for moving said upper and lower platens a distance apart following a baking cycle;

f. removal means mounted to said oven enclosure for removing baked materials from between parted ones of said upper and lower platens, said removal means being mounted adjacent a run of said pair of endless chains at which said baking units are inverted and being positioned to push baked goods from the flat faces of said upper platens when said baking units are parted; each of said removal means including a pusher member having:

(i) body section that is pivotally mounted to said oven enclosure and a nose section that extends at an angle from said body section, and (ii) a roller mounted at the end of said body section opposite said nose section;

said pusher member being positioned such that said nose portion points in a direction opposite to the normal direction of travel of said two endless chains and such that said roller rides onto a said flat face of a said upper platen and, followingly, said nose portion engages a baked good lying on said flat face and pushes the same from said upper platen;

g. introduction means mounted to said oven enclosure for introducing material to be baked into said cups of said baking units; and h. heating means mounted in said oven enclosure to heat said baking units as the same travel along said horizontal runs.

4. A baking machine according to claim 3 wherein, for each of said baking units, said connecting means which reciprocatably connects said upper platen to said lower platen comprises (i) an elongate stem member which is fixed to said upper platen and positioned to extend through said lower platen and (ii) an aperture formed in said lower platen to slidably receive said elongate stem member.

5. A baking machine according to claim 4 further including, for each of said baking units, a second stem member which is fixed to said upper platen and positioned to slidably extend through said lower platen and a second aperture is formed in said lower platen to receive said second stem member.

6. A baking machine according to claim 4 wherein the distal end of said stem member projects below said lower platen and said resilient biasing means comprises a compression spring which encircles the distal end and a collar member is connected to the distal end to retain said compression spring in a position to bias said upper platen toward said lower platen.

7. A baking machine according to claim 6 further including, for each of said baking units, a bracket member which is fixed to said upper platen and a roller wheel rotatably mounted on said bracket, and wherein said opening means includes a rail member stationarily mounted at a preselected position to engage said roller wheels on said baking units so that said roller wheels run along said rail member and, as a result, said upper platens are pulled away from said lower platens.

8. A baking machine according to claim 7 wherein said baking units are inverted on every other horizontal run of said pair of endless chains.

9. A baking machine according to claim 7 wherein, for each of said baking units, two of said cup members are fixedly mounted side-by-side on the upper face of said lower platen in a line transverse to said pair of endless chains.

10. A baking machine according to claim 7 further including two endless conveyor belts arranged in series so that material on one belt is carried thereby to deposit on the other belt, said two endless belts being mounted immediately beneath one of said runs in which said baking units are inverted and said rail member is mounted so that the upper platens are pulled away from said lower platens on said run above said two endless conveyor belts, and said removal means is mounted to deposit baked materials from one of said two cups onto one of said two endless conveyor belts and to deposit the baked materials from the other of said two cups onto the other of said two endless conveyor belts.

11. A baking machine according to claim 7 further including two guide tracks which are stationarily mounted parallel to said rail member and positioned to slidably engage respective ones of said two endless chains to prevent lateral movement of said two endless chains in response to the force exerted by said rail member in causing said pairs of platens to move apart.

12. A baking machine according to claim 7 wherein said opening means includes an arcuate bearing member which is mounted at a location just prior to the end of a horizontal run of said pair of endless chains and positioned to press against the distal ends of said stem members to press said upper platens apart from said lower platens as the same pass therearound as said pair of endless chains changes its direction of travel.

13. A baking machine according to claim 3 wherein, for each of said baking units, the face of said upper platen which is directed toward said lower platen is flat, and wherein said removal means is mounted adjacent a run of said pair of endless chains at which said baking units are inverted and is positioned to push baked goods from the flat faces of said upper platens when said baking units are parted.

* * * * *